US006383634B1

(12) United States Patent
Kornfeldt et al.

(10) Patent No.: US 6,383,634 B1
(45) Date of Patent: May 7, 2002

(54) DIELECTRIC GELLING COMPOSITION, THE USE OF SUCH DIELECTRIC GELLING COMPOSITION, AN INSULATED ELECTRIC DC-CABLE COMPRISING SUCH GELLING COMPOSITION, AND A METHOD FOR MANUFACTURING AN INSULATED ELECTRIC DC-CABLE COMPRISING SUCH GELLING COMPOSITION

(75) Inventors: Anna Kornfeldt, Västerås; Johan Felix, Sundbyberg; Mikael Bergkvist, Uppsala; Per Nordberg, Karlskrona; Christer Törnkvist; Thorsten Schütte, both of Västerås, all of (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/582,083

(22) PCT Filed: Dec. 15, 1998

(86) PCT No.: PCT/SE98/02312

§ 371 Date: Aug. 3, 2000

§ 102(e) Date: Aug. 3, 2000

(87) PCT Pub. No.: WO99/33067

PCT Pub. Date: Jul. 1, 1999

(30) Foreign Application Priority Data

Dec. 22, 1997 (SE) .............................................. 9704827

(51) Int. Cl.[7] ........................... B32B 15/00; B05D 5/12; H02G 15/20; H01B 7/00

(52) U.S. Cl. ....................... 428/379; 428/372; 428/375; 428/396; 174/23 C; 174/23 R; 174/120 SR; 174/110 PM; 427/117; 427/118; 427/434.6; 427/439

(58) Field of Search ................................. 428/375, 379, 428/372, 383, 396; 174/23 C, 23 R, 120 SR, 121 R, 121 B, 121 AR, 121 SR, 122 R, 122 C, 120 C, 120 FP, 110 PM; 427/117, 118, 121, 116, 434.6, 439; 252/567, 570, 572; 523/173; 524/474

(56) References Cited

FOREIGN PATENT DOCUMENTS

WO WO 97/04466 2/1997

*Primary Examiner*—Cynthia H. Kelly
*Assistant Examiner*—J. M. Gray
(74) *Attorney, Agent, or Firm*—Dykema Gossett PLLC

(57) ABSTRACT

Disclosed is a dielectric gelling composition, exhibiting a thermo-reversible liquid-gel transition at a transition temperature, $T_t$, wherein the gel comprises an oil and a combined gelator system having molecules of a polymer compound together with fine dielectric particles with a particle size in the nanomneter, 6 nm, range, preferably a particle size within the range from 0.001 to 1000 nm, the use of this dielectric gelling composition in an electric device comprising one or more conductors, a casing or enclosure and an insulation system comprising the dielectric gelling composition. An electric DC-cable having a conductor and an electrical insulation comprising a solid part with a porous, fibrous and/or laminated structure impregnated with the dielectric gelling composition and a method for production of such DC-cable wherein the combined gelator is prepared prior to impregnation are also disclosed.

45 Claims, 1 Drawing Sheet

DIELECTRIC GELLING COMPOSITION, THE USE OF SUCH DIELECTRIC GELLING COMPOSITION, AN INSULATED ELECTRIC DC-CABLE COMPRISING SUCH GELLING COMPOSITION, AND A METHOD FOR MANUFACTURING AN INSULATED ELECTRIC DC-CABLE COMPRISING SUCH GELLING COMPOSITION

TECHNICAL FIELD

The present invention relates to a dielectric gelling composition comprising a dielectric fluid and a gelling additive, in particular an electrical insulation oil to which one or more gelling additives, gelators, i.e. compounds that impart a gelling behaviour in the dielectric fluid, have been added. In particular the invention relates to such a gelling composition exhibiting a thermo-reversible transition between the easy flowing fluid state at high temperatures and a highly viscous and elastic gelled state at low temperatures, a thermo-reversible liquid-gel transition.

The present invention relates in another aspect to the use of such a gelling composition as part of an electrical insulation system for an electric device.

In a particular aspect the present invention relates to an insulated electric direct current cable, an insulated DC-cable, with an insulation system comprising such a dielectric gel with a thermo-reversible liquid-gel transition. The present invention also relates to a method for manufacturing such DC-cable. The insulated DC cable is suited for transmission and distribution of electric power. The insulation system comprises a plurality of functional layers, such as an inner semi-conductive shield, an insulation and an outer semi-conductive shield, wherein at least the insulation comprises a porous, fibrous and/or laminated body impregnated with a dielectric fluid.

BACKGROUND ART

Electrical insulation oils and other dielectric fluids are used in electric insulation systems for devices such as transformers, capacitors, reactors, cables and the like. The dielectric fluids are typically used in combination with a porous, fibrous and or laminated solid part, which is impregnated with the dielectric fluid, the electric insulating oil, but also as encapsulants to prevent water penetration. The active part of an impregnated insulation is the solid part. The oil protects the insulation against moisture pick-up and fills all pores, voids or other interstices, whereby any dielectrically weak air in the insulation is replaced by the oil. Impregnation is typically a time consuming and delicate process carried out after the solid part of the insulation has been applied and needs to be carefully monitored and controlled. For example, the impregnation of a DC-cable intended for a long distance transmission of electric power, where several kilometres of a cable are treated, typically exhibits a process cycle time extending over days or weeks or even months. In addition, this time consuming impregnation process is made according to a carefully developed and strictly controlled process cycle with specified ramping of both temperature and pressure conditions in the impregnation vessel used during heating, holding and cooling to ensure a complete and even impregnation of the fiber-based insulation. The impregnation of other insulation systems comprising dielectric fluids such as transformers, capacitors and the like is, although not as time consuming as the impregnation of a DC-cable, a sensitive process and specific demands are put on the impregnant, the medium to be impregnated and the process variables used for impregnation.

To ensure a good impregnation result, a fluid exhibiting a low-viscosity is desired. The fluid shall also preferably be viscous at operation conditions for the electrical device to avoid migration of the fluid in the porous insulation. Darcy's law (1) is often used to describe the flow of a fluid through a porous or capillary medium.

(1):

$$v = \frac{k\Delta P}{\mu L}$$

In this law v is the so called Darcy velocity of the fluid, defined as the volume flow divided by the sample area, k is the permeability of the porous medium, $\Delta P$ is the pressure difference across the sample, $\mu$ is the dynamical viscosity of the fluid and L is the thickness of the sample. The flow velocity of a fluid within a porous medium is essentially reciprocally proportional to the viscosity. A fluid exhibiting a low-viscosity or a highly temperature dependent viscosity at operating temperature will have a tendency to migrate under the influence of temperature fluctuations naturally occurring in an electric device during operation and also due to any temperature gradient building up across a conductor insulation in operation and might result in unfilled voids being formed in the insulation. Temperature fluctuations and temperature gradients are present in a high-voltage DC cable, and thus any problem associated with migration of the dielectric fluid must be carefully considered. Unfilled voids or other unfilled interstices or pores in an insulation operating under an electrical high-voltage direct current field constitute deficiencies where space charges tend to accumulate. Accumulated space charges might under unfavorable conditions initiate dielectric breakdown through discharges which will degrade the insulation and ultimately might lead to its breakdown. The ideal dielectric fluid should exhibit a low-viscosity under impregnation and be highly viscous under operation conditions.

Conventional dielectric oils used for impregnating a porous, fibrous or laminated conductor insulation in an electric device such as a DC cable exhibit a viscosity that decreases essentially exponential as the temperature increases. The impregnation temperature must therefore be substantially higher than the operation temperature to gain the required decrease in viscosity due to the low temperature dependence of the viscosity at high temperatures. In comparison, the temperature dependence of the viscosity at temperatures prevailing during operation conditions is high. Small variations in impregnation or operation conditions affect the performance of the dielectric fluid and the conductor insulation. Oils are therefore selected such that they are sufficiently viscous at expected operation temperatures to be essentially fully retained in the insulation also under the temperature fluctuations that occur in the electric device during operation. The retention shall also be essentially unaffected of any temperature gradient building up over an insulation. This typically leads to a high impregnation temperature being used to ensure that the insulation will be essentially fully impregnated. However, a high impregnation temperature is disadvantageous as it risks effecting the insulation material, the surface properties of the conductor, and promoting chemical reactions within and between any material present in the device being impregnated. Also energy consumption during production and overall production costs are negatively affected by a high impregnation temperature. Another aspect to consider is the thermal expansion and shrinkage of the insulation which implies that the cooling must be controlled and slow, adding further time and complexity to an already time consuming and complex process. Other types of oil impregnated cables employ a low viscosity oil. However, these cables then comprise tanks or reservoirs along-the cable or associated with the cable to ensure that the cable insulation remains fully impregnated upon thermal cycling experienced during operation. With these cables, filled with a low viscosity oil, there is a risk for oil spillage from a damaged cable. Therefore an oil exhibiting a highly temperature dependent viscosity and with a high viscosity at operating temperature is preferred.

To impart a suitable increased temperature dependency in the viscosity for a conventional mineral oil, it is known to add and dissolve a polymer, e.g. polyisobuthene, in the oil. This can only be achieved for highly aromatic oils, but oils of this kind typically exhibit, poorer electric properties in comparison with more naphtenic oils. These latter are oil types suitable for use in electric insulations. A more aromatic oil must typically be treated with bleaching earth to exhibit acceptable electric properties. Such processing is costly and there is a risk that small sized clay-particles remain in the oil if not a careful filter- or separation-processing is carried out after this treatment. Alternatively, an oil as disclosed in U.S. Pat. No. 3,668,128 comprising additions of from 1 up to 50 percent by weight of an alkene polymer with a molecular weight in the range 100–900 derived from an alkene with 3, 4 or 5 carbon atoms, e.g. polybutene, can be chosen for its low viscosity at low temperatures. This oil exhibits a low viscosity at low temperatures, good oxidation resistance and also good resistance to gassing, i.e. the evolution of hydrogen gas which might occur, especially when an oil of low aromatic content, as the oil suggested in U.S. Pat. No. 3,668,128, is exposed to electrical fields. However, the oil according to the disclosure in U.S. Pat. No. 1,668,128, although offering a major advance on the traditional electrical insulating oil for impregnation of fibrous or laminated insulations, still suffers the risk of oil migration caused by temperature fluctuations and/or temperature gradients building up under operation as the low viscosity oil is typically not retained during operation at elevated temperatures.

The earlier not yet published International Patent Application PCT/SE97/01095 discloses a DC-cable impregnated with a gelling dielectric fluid, such as an oil. The dielectric fluid comprises a gelling polymer additive that imparts to the fluid a thermo-reversible transition between a gelled state at low temperatures and an essentially Newtonian easy flowing state at high temperatures. This substantial transition in viscosity occurs over a limited temperature range. The fluid and the gelling polymer additive are matched to impart a thermo-reversible gelling behavior with a liquid-gel transition range to the fluid to suit the desired properties both during impregnation and operation. The fluid is, at high temperatures, in a liquid state and exhibits the viscosity of an easy flowing Newtonian fluid. At low temperatures the fluid is in a gelled state, with a viscosity of a highly viscous, elastic gel. The transition temperature is determined by the selection of fluid and additive and the content of additive. Such a cable exhibits a substantial potential for reduction of the time period needed for impregnation but it still requires a strictly controlled temperature cycle during impregnation. The gelling polymer additive and the dielectric fluid are matched or optimized to, in the best way, meet the typically conflicting demands during impregnation and use of the cable. There is in the art a strong desire to reduce impregnation temperatures and at the same to increase the current densities in the DC-cables. Increased current densities will while using same conductors and same conductor dimensions lead to increased operation temperatures in the DC-cable. Meeting both these conflicting demands will further reduce the gap between the impregnation temperature and operation temperature. Consequently, it will be harder to match the specific demands even with sophisticated gelling systems. It must be remembered that not only shall essentially all voids and interstices of the cable insulation be filled by the fluid but the fluid shall also be retained in this insulation as the temperature fluctuates and temperature gradients build up during operation. Suitable gelling systems, comprising oils and polymers, for other purposes are discussed in the European Patent Publication EP-A1-0 231 402. This publication discloses a gel-forming compound with slow forming and thermally reversible gelling properties intended to be used as an encapsulant to ensure a good sealing and blocking of any interstices in a cable comprising an all solid insulation, such as an extruded polymer based insulation. The slow-forming thermally reversible gelling compound comprises an admixture of a polymer to a naphtenic or paraffinic oil, and also embodiments using further admixtures of a co-monomer and/or a block copolymer to an oil are considered suitable as encapsulant due to their hydrofobic nature and the fact that they can be pumped into the interstices at a temperature below the maximum service temperature of the encapsulant itself. Similar gel-forming compounds for the same purpose, i.e. the use as encapsulant to block water from entering and spreading longitudinal in a cable are also known from the European Patent Publications, EP-A1-0 058 022 and EP-A1-0 586 158.

Thus, it is desirous to provide a dielectric gelling composition with a thermo-reversible liquid-gel transition at a high temperature, and within a narrow temperature range. The gelling composition shall exhibit properties whereby the impregnation can be enhanced and the impregnation time shortened. It shall exhibit a high viscosity at the temperature range within which the device is designed to operate, thereby reducing the risks for migration and formation of voids upon thermal cycling and/or under thermal gradients. The volume changes upon thermal cycling shall be reduced. In particular importantly, the shrinkage upon cooling after impregnation and any problems associated with such shrinkage shall be reduced. Further, the gelling composition shall exhibit such thermal, mechanical and electric properties and stability in these properties such that it opens for an increase in load, i.e. an increase in both operation voltages and current densities used in the device.

Many of the first electrical supply systems for transmission and distribution of electrical power were based on DC technology. However, these DC systems were rapidly superseded by systems using alternating current, AC. The AC systems had the desirable feature of easy transformation between generation, transmission and distribution voltages. The development of modern electrical supply systems in the first half of this century was exclusively based on AC transmission systems. By the 1950s there was a growing demand for long transmission schemes and it became clear that in certain circumstances there could be benefits by adopting a DC based system. The foreseen advantages include a reduction of problems encountered in association with the stability of the AC-systems, a more effective use of equipment as the power factor of the system is always unity and an ability to use a given insulation thickness or clearance at a higher operating voltage. Against these very significant advantages has to be weighed the cost of the terminal equipment for conversion of the AC to DC and for inversion of the DC back again to AC. However, for a given transmission power, the terminal costs are constant and therefore, DC transmission systems are economical for schemes involving long distances, such as for systems intended for transmission from distant power plants to consumers but also for transmission to islands and other schemes with transmission distances where the savings in the transmission equipment exceed the cost of the terminal plant. An important benefit of DC operation is the virtual elimination of dielectric losses, thereby offering a considerable gain in efficiency and savings in equipment. The DC leakage current is of such small magnitude that it can be ignored in current rating calculations, whereas in AC cables dielectric losses cause a significant reduction in current rating. This is of considerable importance for higher system voltages. Similarly, high capacitance is not a penalty in DC cables. A typical DC-transmission cable includes a conductor and an insulation system comprising a plurality of layers, such as an inner semi-conductive shield, an insulation body and an outer semi-conductive shield. The cable is typically complemented with casing, reinforcement, etc., to withstand water penetration and any mechanical wear or forces during production, installation and use: Almost all the DC cable systems supplied so far have been for submarine crossings or the land cable associated with them. For long crossings the mass-impregnated solid paper insulated type of cable is chosen because there are no restrictions on length due to pressurizing requirements. It has to date been supplied for operating voltages of 450 kV. These voltages are likely to be increased in the near future. To date an essentially all paper insulation body impregnated with an electric insulation oil has been used, but application of laminated material such as a polypropylene paper laminate is being persued. As in the case of AC transmission cables, transient voltages is a factor that has to be taken into account when determining the insulation thickness of DC cables. It has been found that the most onerous condition occurs when a transient voltage of opposite polarity to the operating voltage is imposed on the system when the cable is carrying full load. If the cable is connected to an overhead line system, such a condition usually occurs as a result of lightning transients. A commercially available insulated electric DC-cable such as a transmission or distribution cable designed for operation at a high voltage, i.e. a voltage above 100 kV, is typically manufactured by a process comprising the winding or spinning of a porous, fibrous and/or laminated solid insulation based on cellulose or paper fiber, and the impregnation of this cable. The impregnation process, the times and controlled processing involved have already been described in the foregoing.

Thus it is desirous to provide an insulated DC-cable with an electrical insulation system that ensures stable dielectric properties also when operating at high operation temperatures close to the impregnation temperature and/or under conditions where the insulation during operation is subjected to a high voltage direct current field in combination with thermal fluctuations and/or a build up of a substantial thermal gradient within the insulation. The dielectric fluid employed shall exhibit a high viscosity index such that it during impregnation has a sufficiently low viscosity, i.e. a viscosity deemed suitable and technically and economically favorable for impregnation, and that it after impregnation has a high viscosity and elasticity, i.e. a viscosity that ensures that it during operation, will be essentially retained in the porous, fibrous and/or laminated insulation body at all temperatures within the range of temperatures for which the DC-cable is designed to operate. The DC-cable shall thus comprise a dielectric fluid with a sufficiently low viscosity prior to and during impregnation to ensure stable flow properties and flow behavior within these ranges, and which exhibits a substantial change in viscosity upon impregnation, i.e. a change in the order of hundreds of Pas or more. A DC-cable impregnated with a fluid exhibiting such high viscosity index will provide an opportunity for a substantial reduction in the lengthy time consuming batch-treatment for impregnation of the insulation system, thereby providing a potential for a substantial reduction in the production time and thus the production costs. The reliability, low maintenance requirements and long working life of conventional DC-cables, comprising an impregnated paper-based insulation shall be maintained or improved. That is, the DC-cable shall have stable and consistent dielectric properties and a high and consistent electric strength and, as an extra advantage, open for an increase in the electrical strength and thus allow an increase in operation voltages, improved handleability and robustness of the cable.

SUMMARY OF THE INVENTION

According to the present invention it is an object to provide a dielectric gel, which exhibits a thermo-reversible liquid-gel transition at a high temperature with the desirous features discussed in the foregoing. This is for a dielectric gel according to the preamble of claim 1 accomplished by the features of the characterizing part of claim 1. Further developments of the dielectric gel according to the present invention are characterized by the features of the additional claims 2 to 25. It is also an object to provide the use of such a gel in electric devices. This is accomplished according to claim 26 to 28. In particular its an object of the present invention to provide an insulated electric device comprising such a dielectric gel as impregnant in its impregnated insulation system. This is for a device according to the preamble of claim 29 accomplished by the features of claim 29. Further developments of the DC-cable according to the present invention are characterized by the features of the additional claims 30–38. Further claims 39 to 49 define a method for manufacturing an electric device according to the present invention.

DESCRIPTION OF THE INVENTION

The primary object is accomplished with a dielectric gelling composition, exhibiting a thermo-reversible liquid-gel transition at a transition temperature, $T_t$, wherein the gel comprises an oil and a gelator, which according to the present invention comprises a combined gelator system having molecules of a polymer compound together with fine dielectric particles with a particle size in the nanometer, nm, range, preferably a particle size of 1000 nm or less. Suitably, a particle size of from 1 to 1000 nm, and preferably within the range of from 10 to 100 nm. The dielectric gelling composition which comprises an oil and a gelator exhibits a thermo-reversible liquid-gel transition at a transition temperature, $T_t$, wherein the gelling composition at temperatures below $T_t$ is in a highly viscous elastic gelled stated and, at temperatures above $T_t$, is in a liquid easy flowing essentially Newtonian state. The polymer and the oil interact to develop a three dimensional, physically cross-linked gelled network at temperatures below the transition temperature $T_t$. Typically, the transition temperature $T_t$ is a narrow range of temperatures above 50° C., preferably of from 70° C. to 150° C. Thus, the gelled network of longer and/or more branched polymer molecules or cross-linking bridges in the oil formed through the gelling interaction between the combined gelator and the oil is characterized by the physical bonds developed. The network will increase the viscosity index of the oil such that the gelled network in the oil according to the present invention at temperatures below the transition temperature $T_t$ exhibits the properties of an elastic gel.

According to one embodiment the fine particles are trapped within the gelled network of polymer. The particles can either be mechanically locked in the network or physically bonded to the gelled network of polymer. Alternatively, the polymer molecules are grafted onto the fine particles, but also blends with other types of physical and chemical bonds can be adequate depending on the nature of the particle, the polymer molecule and the oil. The fine particles are preferably evenly distributed within the gelled network and provide a reinforcement of the gelled network and the insulation system. The reinforcement is both electrical and mechanical. Another advantage of the combined gelator systems used according to the present invention is that their gelling kinetics can be modified which opens for a delayed significantly slower gelling if so desired, this delay can in some cases exceed 24 h.

According to one embodiment the dielectric gelling composition comprises silica The gelling composition can also comprise other dielectric inorganic particles with suitable electric and thermal properties such as alumina, zirconia, calcia and other oxides, silicon nitride, electrically insulating forms of carbon, zeolites, unexpanded and expanded mica, clays, talcs and the like. The particles can also be coated with any of the materials mentioned in the foregoing, wherein the coating can be applied also on metallic materials, e.g. fine particles of titanium coated with silica. The fine dielectric particles can also comprise organic materials, such as cellulose based materials, e.g. cellulose powder or microcrystalline cellulose. Typically, the dielectric fluid is an electrical insulation oil to which various gelling additives have been added. Generally, suitable gelling additives for most types of oils are compounds such as;

- a compound compromising a polar segment that has a tendency to develop hydrogen bonds, preferably compounds comprising polar segments and long non-polar hydrocarbon chains,
- sugar based compounds,
- compounds comprising urea or di-urea,
- a compound comprising a block copolymer.

Polymeric compounds as described in the earlier not yet published International Patent Application PCT/SE97/01095 can advantageously be used for at least any dielectric fluid based on a mineral oil. Gelling additives comprising a polyalkylsiloxane are well suited at least for a dielectric fluid based on a silicone oil, while gelling additives comprising a cellulose based compound are suitable for at least any dielectric fluid based on a vegetabilic oil. According to one embodiment the gelling composition also comprises an addition of a surfactant to further enhance impregnation.

A gelling dielectric composition as described in the foregoing comprising oil and a combined gelator system having molecules of a polymer compound together with fine dielectric particles is suitable for use as part of an insulation system in an electric device comprising one or more conductors. Due to the dielectric particles dispersed in the elastic gel of the composition after gelling, an insulation system consisting of a gelled body only comprising dielectric gelling composition can be contemplated, provided that the amount and volume of the dielectric particles are sufficient. According to a preferred embodiment the dielectric gelling composition is included as impregnant in an insulation system comprising a porous, fibrous and/or laminated dielectric body impregnated with the dielectric gelling composition, such as the insulation system in a cable, a transformer or the dielectric between the electrodes in a capacitor. Here it is an advantage that the gelling kinetics of the combined gelator systems used according to the present invention can be modified, which opens for a delayed significantly slower gelling if so desired, this delay can in some cases exceed 24 h. This results in a decreased shrinkage when an insulation comprising a gelling impregnant in the form of the gelling composition according to the invention is used. As a consequence, the "post-filling" step is less critical.

A DC-cable having at least one conductor and an impregnated insulation system, wherein the insulation system comprises a solid electrically insulating dielectric part with a porous, fibrous and/or laminated structure impregnated with a dielectric gelling composition, which according to the present invention comprises oil and the combined gelator system having molecules of a polymer compound together with fine dielectric particles, meets the object set out according to the aspect of the present invention relating to an insulated DC-cable. Preferably the dielectric gelling composition comprises a mineral oil and a combined gelator system comprising dielectric particles with a particle size in the nanometer range and molecules of a polymer compound. The polymer molecules can be grafted onto the fine particles, but also blends with other types of physical and chemicals bonds can be adequate depending on the nature of the particle, the polymer molecule and the oil. Also systems were the particles are trapped in the gelled network upon formation of the gelled network following cooling to a temperature below $T_t$, are advantageous and provide a reinforcement and stabilization of the gelled network and the total insulation system. The components within the dielectric gelling composition and the oil interact to develop a three dimensional, physically cross-linked network at temperatures below the transition temperature $T_t$. Typically, the transition temperature $T_t$ is a narrow range of temperatures above 30 ° C., preferably within the range of from 50 ° C. to 120° C. According to one embodiment the dielectric gelling composition is selected such that it interacts with the surface of the porous, fibrous and/or laminated structure, wherein the interaction between the dielectric gelling composition and the surface of the porous, fibrous and/or laminated structure either can provide conditions that increase the oil penetration into voids and capillary interstices within the porous, fibrous and/or laminated structure upon filling, or that increase the oil retention within the porous, fibrous and/or laminated structure upon operation at a high temperature, fluctuating temperatures and/or under a substantial temperature gradient. Thus, depending on its nature the interaction with the solid parts of the insulation can result in an improved wetting which shortens the impregnation time period due to an increase in the oil penetration into voids and capillary interstices within the porous, fibrous and/or laminated structure upon filling. The interaction can also under other circumstances increase the oil retention within the porous, fibrous and/or laminated structure upon operation at a high temperature, fluctuating temperatures and/or under a substantial temperature gradient. Another advantage of the combined gelator systems used according to the present invention is that their gelling kinetics can be modified, which opens for a delayed significantly slower gelling if so desired, this delay can in some cases exceed 24 h. This results in a decreased shrinkage than for a DC cable comprising gelling composition according to the present invention. As a consequence, the "post-filling" step is less critical.

According to one embodiment the dielectric gelling composition used as impregnant in the DC-cable comprises a mineral oil and a combined gelator system comprising a block copolymer and fine dielectric particles. Particles with suitable electric and thermal properties have been found to be inorganic particles such as silica, alumina, zirconia, calcia and other oxides, silicon nitride, electrically insulating forms of carbon, zeolites, unexpanded and expanded mica, clays, talcs and the like, coated particles comprising a coating of any of the materials mentioned in the foregoing wherein the coating can be applied also on metallic materials, e.g. fine particles of titanium coated with silica and organic materials, such as cellulose based materials, e.g. cellulose powder or micro-crystalline cellulose. The polymer can be polystyrene, a di- or tri block copolymer of styrene-butadiene-stryene or styrene-ethylene/butylene-styrene. The cable can, when deemed appropriate, be complemented with reinforcing and a sealing compound or a water swelling powder for filling any interstices in and around the conductor, other metal/polymer interfaces may be sealed in order to prevent water from spreading along such interfaces.

A method for manufacture of an insulated electric device such as a DC-cable according to the present invention with an insulation system impregnated with a dielectric gelling composition comprising an oil and a gelator and exhibiting a thermo-reversible liquid-gel transition at a transition temperature, $T_t$, wherein the gelling composition at temperatures below $T_t$, is in a highly viscous elastic gelled stated and, at temperatures above $T_t$, is in a liquid easy flowing essentially Newtonian state, comprises the steps of;

- providing a conductor and a porous, fibrous and/or laminated structure of a solid electrically insulating material associated with each other; and
- impregnating the porous, fibrous and/or laminated structure with a dielectric fluid, and
- gelling the dielectric gelling composition in the presence of a gelator to impart the high viscosity and elasticity of a gel to the fluid at any conditions for which the device is designed to operate under, wherein a combined gelator system comprising polymer molecules and fine dielectric particles with a particle size in the nanometer range is prepared. Preferably the combined gelator system is added to the oil prior to impregnation and the impregnation is carried out at a temperature above the transition temperature $T_t$. According to one embodiment the polymer molecules are grafted onto the fine dielectric particles. According to an alternative method the cable is, following impregnation, cooled to a temperature below $T_t$, and following cooling a gelled network is formed in the gelling dielectric composition whereby the particles are trapped in the gelled network. The particles shall preferably be evenly distributed in the gelled network.

According to one embodiment the combined gelator system is added to the oil prior to impregnation and the impregnation is carried out at a temperature above the transition temperature $T_t$, typically at a temperature of below 120° C., preferably at a temperature of from 50° C. to 120° C.

According to an alternative method the porous, fibrous and/or laminated structure is pretreated with the combined gelator system prior to impregnation and the impregnation is carried out at a reduced temperature, typically at a temperature of from 0° C. to 100° C., preferably at a temperature of from 20° C. to 70° C. The wound insulation can be soaked in or sprayed with a solution comprising a gelator, dried and thereafter impregnated, but preferably it is wound from tapes that are already pretreated with gelling additives. The tapes can have been pretreated already in the line for tape production, but the treatment can of course also have been done in a special treatment operation or in connection with the winding. This is the same for any type of tape, such as an all paper tape, an all polymer tape or a laminated tape of paper and polymeric films or different polymeric films or meshes, webs or nets. Paper tapes can have been coated by spraying or immersing or otherwise contacting the paper with a solution comprising the gelling additive. The gelling additive can have been added to polymeric films, tapes or the like by spraying or extruding the gelling additive on to the polymer. A coating comprising the gelling additive can also have been co-extruded with the polymeric tape or film. Thus, for a DC-cable comprising such a pretreated insulation, this embodiment will ensure that the oil retains its easy flowing essentially Newtonian properties during the essential period of filling phase of the impregnation step and that the gelling additive thereafter, when brought into contact with the oil and at least in part dissolved by the oil, imparts the properties of a highly viscous, elastic gel to oil. The transformation of the easy flowing dielectric fluid to a highly viscous gel can dependent of the combination of gelling additive and dielectric fluid be instant, slow or even delayed. By instant transformation is meant that the transformation is initiated directly as the gelling additive is contacted and dissolved by the dielectric fluid and that the transformation kinetics are such that the transformation is rapid. The slow transformation is also typically initiated directly upon contact between fluid and gelling additive but the transformation is slowed down by the kinetics of the dissolution and/or transformation. A delayed transformation for up to 24 hours can typically be accomplished by the gelling systems, gelator and matched oil, used in DC-cables according to the present invention.

According to one further embodiment the impregnation is carried out in the presence of a surfactant to further enhance the wetting during impregnation and thus provides opportunities for a shortened impregnation time and also for an improved oil penetration into small voids. The surfactant can either be added to the porous, fibrous and/or laminated structure prior to impregnation by a pretreatment or it can be dissolved in the gelling composition prior to impregnation dependent of which is deemed suitable from case to case.

According to one embodiment the different components of the combined gelator system, i.e. the fine particles and the polymer compound are added to different medium prior to impregnation. That is, the particles are added to the solid part and the polymer to the oil or the particles are added to the oil and the polymer to the solid part, whatever is found suitable. Of course, the natural is way to add the combined gelator system to either the solid part or the oil.

According to one further embodiment, the gelling additive is unevenly distributed within the insulation such that it exhibits a concentration gradient of the gelling additive that is increased inwards to the conductor. By distributing the gelling additive in this manner within the insulation several important aspects can be improved;

- a more complete filling before start of gelling is ensured also for a gelling system that gels almost instantly;
- a self-healing capability is accomplished, i.e. a damaged part of the insulation can be re-impregnated with fluid from other parts,
- a gelled fluid that retains its highly viscous elastic gelled state also when the temperature around the conductor is raised because of high loads used is obtained.

To ensure the long term stability-of the improved electrical and mechanical properties a gasabsorbing additive is included in the insulating system. A suitable gasabsorbing additive is a low molecular polyiosbutene with a molecular weight less than 1000 g/mole.

A DC-cable according to the present invention is ensured long term stable and consistent dielectric properties and a high and consistent electric strength as good as, or better than for any conventional DC-cable comprising such impregnated porous, fibrous and/or laminated body. This is especially important due to the long life such installations typically are designed for, and the limited access for maintenance to such installations. The special selection and matching of the components in the combined gelator system, other additives, and oils, impregnants, ensure the long term stable properties of the insulation system also when used at elevated temperatures, at excessive thermal fluctuations and/or under thermal gradients. This opens for a capability to allow an increase in the operation load both in regards of increased voltages and current densities. One further advantage of a DC-cable according to the present invention is that it, due to the surfactant character of the gelators used in DC-cables according to the present invention, opens for a reduction in production time by enhanced wetting, which offers a possible shortened impregnation cycle. Also the temperature sensitivity during production can be substantially reduced by a suitable selection and matching of oil and the components in the combined gelator system which, opens for a delayed gelling, and thereby reduced sensitivity of the post-filling step.

BRIEF DESCRIPTION OF THE DRAWINGS

The present invention shall be described more in detail under reference to the drawings and examples.

DESCRIPTION OF PREFERRED EMBODIMENTS, EXAMPLES

Figure 1:
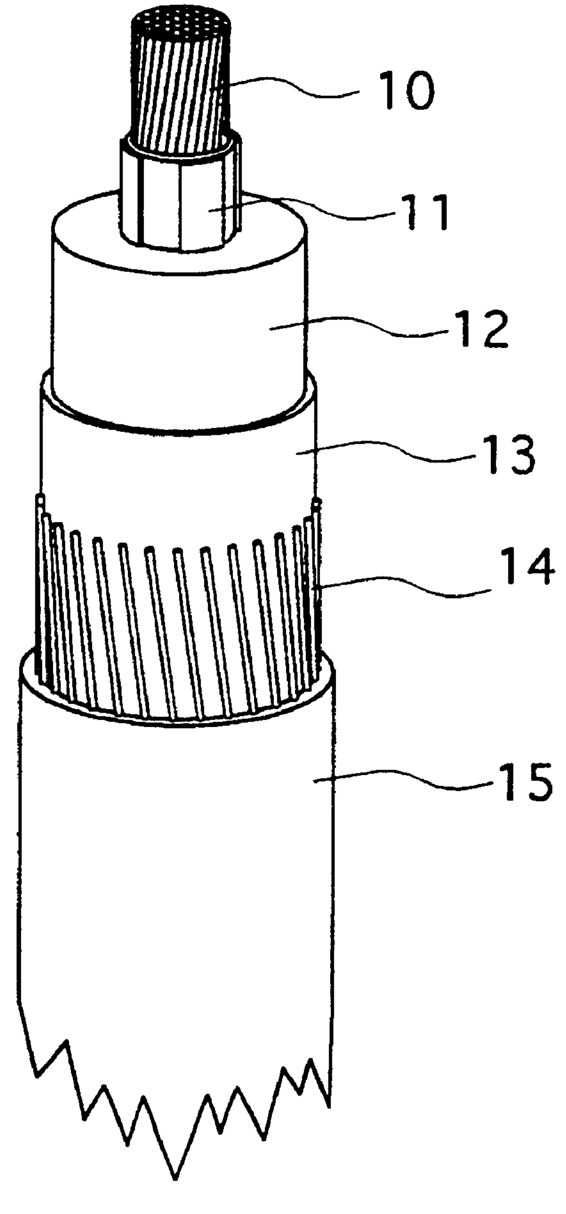
FIG. 1 shows a cross-section of a typical DC-cable for transmission of electric power comprising a wound and impregnated insulation according to the present invention.

The DC-cable according to the embodiment of the present invention shown in FIG. 1 comprises from the center and outwards;

- a stranded multi-wire conductor 10;
- a first semi-conducting shield 11 disposed around and outside the conductor 10 and inside a conductor insulation 12;
- a wound and impregnated conductor insulation 12 comprising a gelling additive as described in the foregoing;
- a second semi-conducting shield 13 disposed outside the conductor insulation 12;
- a metallic screen 14; and
- a protective sheath 15 arranged outside the metallic screen 14. The cable is further complemented with a reinforcement in form of metallic, preferably steel, wires outside the outer extruded shield 13, a sealing compound or a water swelling powder is introduced in any interstices in and around the conductor 10.

The dielectric gelling composition of the present invention is applicable for any arbitrary DC-cable with an insulation system comprising a solid porous or laminated part impregnated with a dielectric fluid or mass. The application of the present invention is independent of conductor configuration. It can also be used with DC-cables having an insulation system of this type comprising any arbitrary functional layer(s) and irrespective of how these layers are configured. Its application to DC-cables of this type is also independent of the configuration of the system for transmission of electric power in which the cable is included.

The DC-cable according to the present invention can be a single multi-wire conductor DC-cable as shown in FIG. 1, or a DC-cable with two or more conductors. A DC-cable comprising two or more conductors can be of any known type with the conductors placed side-by-side in a flat cable arrangement, or in a two conductor arrangement with one first central conductor surrounded by a concentrically arranged second outer conductor. The outer conductor is typically arranged in the form of an electrically conductive sheath, screen or shield, typically a metallic screen not restricting the flexibility of the cable.

A DC-cable according to the present invention is suitable for use in both bipolar and monopolar DC-systems or installations for transmission of electric power. A bipolar system typically comprises two or more associated single conductor cables or at least one multiconductor cable, while a monopolar installation has at least one cable and a suitable current return path arrangement.

EXAMPLE 1

A gelling dielectric composition comprising a mineral oil and a combined gelator system was prepared. The gelator system comprised polystyrene molecules grafted or adsorbed onto silica particles with a particle size in the nanometer range. The polystyrene molecules of the gelator system will thus interact with each other to develop a three dimensional, physically cross-linked network at temperatures below the transition temperature $T_r$ 50–80° C. The bonds in this network are sufficiently strong so that the composition at temperatures below $T_r$ 50° C. behaves like an elastic or viscoelastic gel. A block of bundled porous, fibrous paper was impregnated with the gelling composition which, at temperatures up to 50° C., was fully retained in the porous, fibrous insulation and between the paper layers.

EXAMPLE 2

The same gelling composition as prepared in example 1 was used to impregnate a bundle of polypropen films, where the films were of the solid type. The gelling composition was fully retained between the film layers in the laminated insulation.

EXAMPLE 3

The same gelling composition as prepared in example 1 was used to impregnate a bundle of laminated polypropen-paper sheets, where each sheet comprises a polypropen film of the solid type laminated with a paper film. The gelling composition was fully retained in the paper part of the insulation and between the laminated layers.

EXAMPLE 4

A gelling dielectric composition comprising a mineral oil and a combined gelator system was prepared. The gelator system comprised styrene-butadiene-styrene di block copolymer molecules grafted or adsorbed onto silica particles with a particle size in the nanometer range. The polystyrene molecules of the gelator system will thus interact with each other to develop a three dimensional, physically cross-linked network at temperatures below the transition temperature $T_r$ 50° C. The bonds in this network are sufficiently strong so that the composition at temperatures below $T_t$ 50° C. behaves like an elastic or viscoelastic gel. A block of bundled porous, fibrous paper was impregnated with the gelling composition which, at temperatures up to 50° C., was fully retained in the porous, fibrous insulation and between the paper layers.

EXAMPLE 5

The same gelling composition as prepared in example 4 was used to impregnate a bundle of polypropen films, where the films were of the solid type. The gelling composition was fully retained between the film layers in the laminated insulation.

EXAMPLE 6

The same gelling composition as prepared in example 4 was used to impregnate a bundle of laminated polypropen-paper sheets, where each sheet comprises a polypropen film of the solid type laminated with a paper film. The gelling composition was fully retained in the paper part of the insulation and between the laminated layers.

EXAMPLE 7

A gelling dielectric composition comprising a mineral oil and a combined gelator system was prepared. The gelator system comprised styrene-ethylene/butylene -styrene tri block copolymer molecules grafted or adsorbed onto silica coated titanium particles with a particle size in the nanometer range. The polystyrene molecules of the gelator system will thus interact with each other to develop a three dimensional, physically cross-linked network at temperatures below the transition temperature $T_t$ 50–80° C. The bonds in this network are sufficiently strong so that the composition at temperatures below $T_t$ 50° C. behaves like an elastic or viscoelastic gel. A block of bundled porous, fibrous paper was impregnated with the gelling composition which, at temperatures up to 50° C., was fully retained in the porous, fibrous insulation and between the paper layers.

EXAMPLE 8

The same gelling composition as prepared in example 7 was used to impregnate a bundle of polypropen films, where the films were of the solid type. The gelling composition was fully retained between the film layers in the laminated insulation.

EXAMPLE 9

The same gelling composition as prepared in example 7 was used to impregnate a bundle of laminated polypropen-paper sheets, where each sheet comprises a polypropen film of the solid type laminated with a paper film. The gelling composition was fully retained in the paper part of the insulation and between the laminated layers.

EXAMPLE 10

Examples 1 to 9 were repeated, except for using zeolite particles in place of the silica particles and silica coated titanium particles, with similar good results. The transition temperature was in the range 50–80° C.

These blends of the examples referred to exhibit a development of a stable network and a high temperature liquid-gel transition. The results of these examples have shown it probable that with these gelators added to an oil used for impregnation of a conductor insulation in a DC-cable according to the present invention, faster impregnation rates and lower impregnation temperatures can be employed compared to conventionally used gelling impregnants. Further, the retention test described in the examples shows that the gelling compositions at temperatures below $T_t$ behave like elastic bodies and that the oil is at these temperatures fully retained in the porous, fibrous insulation and between the laminated layers. Repeating this last test for oil retention for a conventionally used insulating oil show a slows flow of oil, leaking out from the bundled block. Thus, the risk for voids appearing during operation is drastically reduced and the electrical properties of the conductor insulation in a device according to the invention are improved. The improvements related to in the foregoing are likely to result in a cable comprising a wound paper-insulation impregnated with the dielectric system described in the foregoing where essentially all voids in the insulation are filled by the dielectric impregnant, i.e. the insulation is essentially fully impregnated. Such a cable is also likely to, after use at elevated temperatures and high electrical, essentially static fields, exhibit a low number of unfilled voids and thus to be less sensitive to dielectric breakdown.

What is claimed is:

1. A high voltage electric cable for transmission or distribution of electric power having at least one conductor and an impregnated insulation system comprising a solid electrically insulating dielectric part with a porous, fibrous and/or laminated structure impregnated with a dielectric gelling composition comprising an oil and a gelator and having a thermo-reversible liquid-gel transition at a transition temperature, $T_t$, wherein the gelling composition at temperatures below $T_t$ has a first viscosity and, at temperatures above $T_t$, has a second viscosity which is less than the first viscosity, the gelator comprises a combined gelator system having molecules of a polymer compound, said compound comprising a polar segment capable of forming hydrogen bonds, together with fine dielectric particles having a particle size of less than 1000 nm.

2. A high voltage electric cable according to claim 1, wherein the fine dielectric particles have a particle size in the range of from 1 to 1000 nm.

3. A high voltage electric cable according to claim 2, wherein the fine dielectric particles have a particle size in the range of from 10 to 100 nm.

4. A high voltage electric cable according to claim 1, wherein the polymer compound and the oil interact to develop a three dimensional, physically cross-linked gelled network at temperatures below the transition temperature $T_t$.

5. A high voltage electric cable according to claim 4, wherein the fine dielectric particles are trapped within a gelled network of polymer.

6. A high voltage electric cable according to claim 5, wherein the fine dielectric particles are physically bonded to the gelled network of polymer.

7. A high voltage electric cable according to claim 1, wherein the polymer molecules are grafted onto the fine particles.

8. A high voltage electric cable according to claim 1, wherein the fine dielectric particles are evenly distributed within a gelled network of polymer.

9. A high voltage electric cable according to claim 1, wherein the transition temperature $T_t$, is a narrow range of temperatures above 30° C.

10. A high voltage electric cable according to claim 9, wherein the transition temperature ranges from 50° C. to 120° C.

11. A high voltage electric cable according to claim 1, wherein the fine dielectric particles comprise cellulose based particles.

12. A high voltage electric cable according to claim 11, wherein the fine dielectric particles comprise micro crystalline cellulose.

13. A high voltage electric cable according to claim 1, wherein the fine dielectric particles comprise electrically insulating inorganic particles.

14. A high voltage electric cable according to claim 13, wherein the fine dielectric particles comprise a metal oxide.

15. A high voltage electric cable according to claim 14, wherein the fine dielectric particles comprise silica.

16. A high voltage electric cable according to claim 1, wherein the fine dielectric particles comprise a zeolite.

17. A high voltage electric cable according to claim 1, wherein the fine dielectric particles comprise a clay.

18. A high voltage electric cable according to claim 1, wherein the fine polymer compound comprises polar segments and linear non-polar hydrocarbon chains soluble in the dielectric gelling composition.

19. A high voltage electric cable according to claim 1, wherein the polymer compound comprises a sugar based compound.

20. A high voltage electric cable according to claim 1, wherein the polymer compound comprises urea or di-urea.

21. A high voltage electric cable according to claim 1, wherein the polymer compound comprises a block copolymer.

22. A high voltage electric cable according to claim 1, wherein the polymer compound comprises a polyalkylsiloxane.

23. A high voltage electric cable according to claim 1, wherein the polymer compound comprises a cellulose based compound.

24. A high voltage electric cable according to claim 1, including a surfactant.

25. An insulated electric device according to claim 1, wherein the dielectric particles at temperatures below $T_t$ are trapped within a gelled network.

26. A high voltage electric cable according to claim 1, wherein the dielectric gelling composition interacts with the surface of the porous, fibrous and/or laminated structure.

27. A high voltage electric cable according to claim 1, wherein the dielectric gelling composition comprises a mineral oil and a combined gelator system comprising a block copolymer and fine dielectric particles.

28. A high voltage electric cable according to claim 1, wherein the dielectric gelling composition comprises a mineral oil and a gelator system comprising a block copolymer that comprises an olefin based block and one block with aromatic rings in its backbone structure.

29. A high voltage electric cable according to claim 1, wherein the dielectric gelling composition comprises a polystyrene.

30. A high voltage electric cable according to claim 1, wherein the dielectric gelling composition comprises a styrene-ethylene/butylene-styrene triblock copolymer.

31. A high voltage electric cable according to claim 1, wherein the dielectric gelling composition comprises a styrene-butadiene-styrene triblock polymer.

32. A method of manufacturing a high voltage electric cable according to claim 1 comprising:

providing a conductor and a porous, fibrous and/or laminated structure of a solid electrically insulating material associated with each other; and impregnating the porous, fibrous and/or laminated structure with a dielectric fluid, and gelling the dielectric gelling composition in the presence of a gelator to impart a viscosity of a gel to fluid at any condition for which the high voltage electric cable is designed to operate under, wherein a combined gelator system comprising polymer molecules of a polymer compound, said compound being selected from polymer compounds comprising a polar segment capable of forming hydrogen bonds, a sugar based compound, urea or di-urea, a block copolymer, a polyalkylsiloxane, a cellulose based compound, together with fine dielectric particles based on dielectric organic or inorganic materials, or any particles coated with such material, said particles a particle size of less than 1000 nm, is prepared.

33. A method according to claim 32, wherein the combined gelator system is added to the oil prior to impregnation and that the impregnation is carried out at a temperature above the transition temperature $T_t$.

34. A method according to claim 32, wherein the polymer molecules are grafted onto the fine dielectric particles.

35. A method according to claim 32, wherein following impregnation the cable is cooled to a temperature below $T_t$, and that following cooling a gelled network is formed in the gelling dielectric composition whereby the fine dielectric particles are trapped in the gelled network.

36. A method according to claim 35, wherein the fine dielectric particles are evenly distributed in the gelled network.

37. A method according to claim 32, wherein the impregnation is carried out at a temperature below 120° C.

38. A method according to claim 37, wherein the temperature ranges from 50° C. to 120° C.

39. A method according to claim 32, wherein the porous, fibrous and/or laminated structure is pretreated with the combined gelator systems prior to impregnation and that the impregnation is carried out at a reduced temperature.

40. A method according to claim 39, wherein the impregnation of the pretreated structure is carried out at a temperature of from 0° C. to 100° C.

41. A method according to claim 40, wherein the temperature ranges from 20° C. to 70° C.

42. A method according to claim 32, where the impregnation is carried out in the presence of a surfactant.

43. A method according to claim 42, wherein that the porous, fibrous and/or laminated structure is pretreated with the surfactant prior to impregnation.

44. A method according to claim 42, wherein that the surfactant is dissolved in the gelling composition prior to impregnation.

45. A method of manufacturing a high voltage electric cable for transmission or distribution of electric power comprising a dielectric gelling composition comprising an oil and a gelator and having a thermo-reversible liquid-gel transition at a transition temperature, $T_t$, wherein the gelling composition at temperatures below $T_t$ has a first viscosity and, at temperatures above $T_t$, has a second viscosity which is less than the first viscosity, wherein the method comprises:

providing a conductor and a porous, fibrous and/or laminated structure of a solid electrically insulating material associated with each other;

impregnating the porous, fibrous and/or laminated structure with a dielectric fluid; and gelling the dielectric gelling composition in the presence of a gelator to impart a viscosity of a gel to the fluid at any conditions for which the device is designed to operate under, wherein a combined gelator system of polymer molecules exhibiting a polar segment capable of forming hydrogen bonds molecules and fine dielectric particles with a particle size of less than 1000 nm is prepared.

* * * * *